United States Patent

Dümmel

[11] Patent Number: 5,146,052
[45] Date of Patent: Sep. 8, 1992

[54] MUFFLER FOR INTERNAL-COMBUSTION ENGINE EXHAUST GASES AND METHOD OF ASSEMBLY THEREOF

[75] Inventor: Karl-Heinz Dümmel, Egenhausen, Fed. Rep. of Germany

[73] Assignee: Friedrich Boysen GmbH & Co. KG, Fed. Rep. of Germany

[21] Appl. No.: 525,645

[22] Filed: May 21, 1990

[30] Foreign Application Priority Data

May 24, 1989 [DE] Fed. Rep. of Germany ....... 3916872

[51] Int. Cl.$^5$ .......................... F01N 7/10; F01N 7/18
[52] U.S. Cl. ..................... 181/240; 181/243
[58] Field of Search ............... 181/240, 243, 230, 282, 181/217, 229, 212, 213

[56] References Cited

U.S. PATENT DOCUMENTS

| | | | |
|---|---|---|---|
| 3,798,769 | 3/1974 | Bailey | 181/240 X |
| 3,835,956 | 9/1974 | Kishira | 181/229 |
| 4,854,417 | 8/1989 | Uesugi et al. | 181/240 X |

FOREIGN PATENT DOCUMENTS 7604869  5/1979  Fed. Rep. of Germany .

*Primary Examiner*—Russell E. Adams
*Assistant Examiner*—Joe Noh
*Attorney, Agent, or Firm*—Evenson, Wands, Edwards, Lenahan & McKeown

[57] ABSTRACT

A muffler housing consists essentially of two shell parts and is penetrated by pipes arranged between the shell parts. Fastening screws are inserted through the pipes into receiving holes at one of the shell parts and are accessible there.

8 Claims, 1 Drawing Sheet

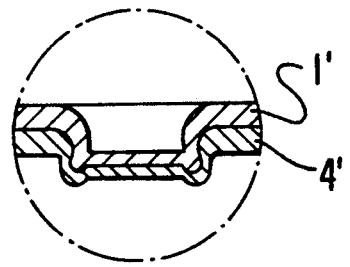
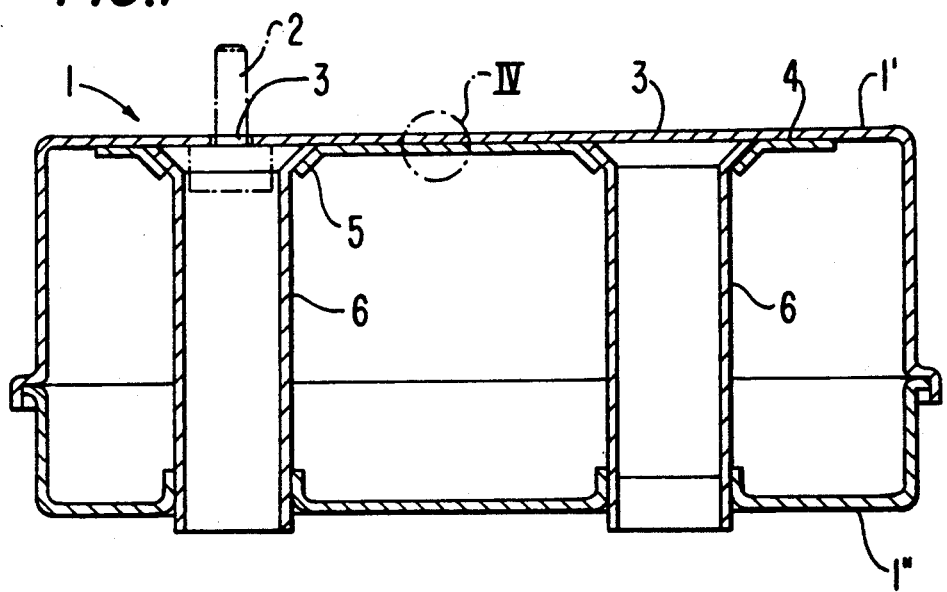
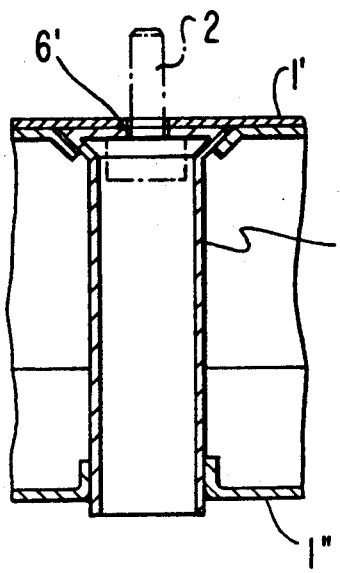
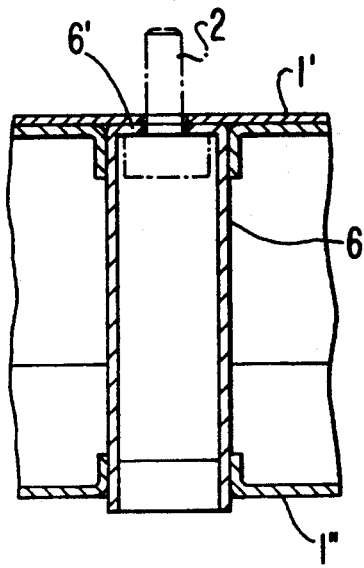

MUFFLER FOR INTERNAL-COMBUSTION ENGINE EXHAUST GASES AND METHOD OF ASSEMBLY THEREOF

BACKGROUND AND SUMMARY OF THE INVENTION

The present invention relates to a muffler for internal-combustion engine exhaust gases and a method of assembling the same, and, in particular, small mufflers for small appliance motors, such as motor saws and the like, having a housing which is essentially composed of two shell parts as well as passage bores for fastening screws arranged in the housing for holding the muffler at the internal-combustion engine, with only the shell part on the engine side being screwed to the engine.

In the case of a small muffler of this type shown in FIGS. 1 and 2 of DE-GM 76 04 869, the heads of the fastening screws hold the engine-side shell part on the cylinder head of the engine and are arranged inside the muffler. Thus, the screws are accessible only after the shell part facing away from the engine is demounted, this part being held at the engine-side shell part by screws.

In addition, FIG. 6 of DE-GM 76 04 869, as well as the GB-PS 14 47 877, show a muffler in which the fastening screws penetrate the muffler housing such manner that the screwheads rest on the exterior side facing away from the engine of the shell part which faces away from the engine, and the threaded parts of the screws projecting out of the engine-side shell part are screwed into engine-side threaded bores arranged there. This arrangement has the advantage that the fastening screws, in contrast to the known embodiment discussed above, can be mounted easily. Under certain circumstances, however, the fastening screws as well as the muffler housing are subjected to considerable temperatures, with the additional difficulty that the thermal stressing of the muffler housing the fastening screws may differ extensively depending on the engine load. Severe temperature changes must be correspondingly expected, and these changes necessarily have the result that the elements of the muffler housing and the fastening screws change their dimensions in correspondence with the respective temperature. Under certain circumstances, considerable mechanical distortions may therefore occur. After an extended use of the device, the seat of the fastening screw may become loose, for example, because the muffler housing was deformed as a result of strong mechanical tensions or because elastic intermediate elements are overstrained.

It is therefore an object of the present invention to provide a muffler and a method of assembly the muffler whose fastening screws, on one hand, are easily accessible and, on the other hand, can withstand extremely high thermal stress. At the same time, it is another object to make possible a simple construction and a simple mounting of the muffler.

According to the present invention, the foregoing objects are achieved by a construction and assembly method which makes the fastening screws accessible from the housing side formed by the shell part facing away from the engine, through pipes penetrating the housing. The pipe end, in the vicinity of the assigned passage bore, is held at the engine-side shell part, and the other pipe end forms an opening penetrating the shell part facing away from the engine.

As a result of the construction and assembly method and assembly method of the muffler according to the present invention, the heads of the fastening screws may be sunk in the housing, in which case the screwheads, from the direction of the interior side of the engine-side shell part, are braced against that shell part without stressing the other shell part. Because of this method of construction, extremely short fastening screws are sufficient because the changes of dimensions caused by temperature fluctuations are practically negligible. The heads of the fastening screws always remain accessible through the pipes without requiring disassembly of the muffler housing.

In addition, it is an advantage of the present invention that the engine-side shell part can be braced in a practical manner directly between the screw heads and engine-side holding parts by the screws without any stressing by tension forces of the housing of the muffler. During the mounting, the flexibility of the muffler housing, therefore, does not have to be taken into account in any way.

In a preferred embodiment of the present invention, a reinforcing bottom having openings arranged concentrically with respect to the passage bores rests on the interior side of the engine-side shell part. The pipes are held at this reinforcing bottom in a force-locking and/or form-fitting manner. In this manner, the shell part used for the fastening of the muffler can be reinforced in a simple way. At the same time, this construction offers the advantage that the reinforcing bottom may be assembled with the pipes before the connection of the reinforcing bottom and the shell part in order to facilitate the mounting of the pipes.

The connection of the shell part and of the reinforcing bottom may take place by pressure assembling. In this case, cup-type indentations are pressed into the sheets of the reinforcing bottom and the shell part which are disposed on top of one another. The cup edges of the indentations of the shell part and the reinforcing bottom engage in one another in a form-fitting and/or force-locking manner.

The openings of the reinforcing bottom which are concentric with respect to the passage bores of the fastening screws at the engine-side shell part may each have an edge which is flanged or folded over toward the interior of the housing and which, with the application of pressure, surrounds the pipe end assigned to the respective opening.

In a particularly advantageous embodiment of the present invention, each of the openings of the reinforcing bottom have an edge which is flanged or folded over in the direction to the interior of the housing with a funnel shape tapering in the direction of the interior. The ends of the pipes assigned to the reinforcing bottom each have a funnel shape fitting into the funnels of the reinforcing bottom such that the funnel-shaped pipe ends are form-fittingly—and in addition possibly also force-lockingly, held between the engine-side shell part and the funnel-shaped edges of the openings of the reinforcing bottom.

The pipe ends facing the engine-side shell part, in the direction of the pipe axis, may have flanged annular front faces, particularly such that the central openings remaining in the front faces have approximately the same diameter as the passage bores of the engine-side shell part arranged with the same axis. The annular front faces form a reinforcement of the surrounding areas of the passage bores of the engine-side shell part as well as a bearing surface for the heads of the fastening screws.

The open ends of the pipes penetrating the shell part facing away from the engine are preferably fitted into the openings of this shell part with the application of pressure. For this purpose, it is advantageously provided to taper or chamfer the exterior side of the pipe ends in the area of the shell part facing away from the engine in a funnel-shaped manner in the direction of the pipe ends such that the shell part facing away from the engine can be pushed with its openings onto the pipe ends with increasing pressure between the pipe ends and the opening edges.

A particularly significant advantage of the muffler construction and method according to the present invention is that the muffler housing can be completely assembled and form a stable unit before muffler elements are tightly soldered together with one another. Thus, by virtue of the reinforcing bottom which can be connected with the engine-side shell part by pressure-assembling, the pipes can be held at the shell part on the engine side. The shell part facing away from the engine is held at the ends of the pipes facing away from the engine by a press fit. Then the edges of the shell parts disposed on top of one another can be soldered together with one another; and the pipe ends are connected with the respective shell parts also by soldering.

BRIEF DESCRIPTION OF THE DRAWINGS

These and other objects, features and advantages of the present invention will become more apparent from the following detailed description of several preferred embodiments when taken in conjunction with the accompanying drawings wherein:

FIG. 1 is a longitudinal sectional view of the muffler according to the present invention;

FIG. 2 is a partial sectional view in the area of a pipe arranged between the shell parts according to a modified embodiment of the present invention;

FIG. 3 is a partial sectional view similar to FIG. 2 of another modified embodiment; and FIG. 4 is a detail view in the dot-dash circle IV in FIG. 1.

DETAILED DESCRIPTION OF THE DRAWINGS

A muffler housing designated generally by the numeral 1 comprises essentially two shell parts 1' and 1'', and an inlet opening (not shown) as well as an outlet opening (not shown) for the exhaust gases of an internal-combustion engine.

The housing 1 is held on the side of shell part 1' at an internal-combustion engine (not shown) or on an appliance driven by the internal-combustion engine, such as a motor saw. Fastening screws 2 (illustrated in phantom lines) are used to hold the housing to the engine or appliance. The heads of the screws 2 are sunk in the housing 1 as shown in FIG. 1. The fastening screws 2 penetrate receiving openings 3 in the shell part 1'.

A reinforcing bottom 4 is arranged on the fastening side of the housing 1 on the interior side of the shell part 1'. This reinforcing bottom 4 has openings which are concentric with respect to the receiving openings 3. According to FIG. 4, the shell part 1' and the reinforcing bottom 4 may connected by pressure-assembling. In such case, a cup-type indentation is pressed into the sheets of the shell part 1' and the reinforcing bottom 4 which are disposed on top of one another, and the annular cup-walls in the shell part 1' and in the reinforcing bottom 4 are pressed against one another in a form-fitting and force-locking manner and thus are practically undetachably connected with one another.

The openings of the reinforcing bottom 4 which are concentric with respect to the receiving openings 3 in the shell part 1' have edges 5 which are folded over or flanged in the direction of the interior space of the housing 1 and are constructed to be approximately funnel-shaped with a cross-section which tapers in the direction of the interior space of the housing. The edges 5 are used for holding pipes 6 which are arranged between the shell parts 1' and 1'' and which penetrate the housing 1.

The ends of the pipes 6 facing shell part 1' are widened in the shape of a funnel in such a manner that the funnel-shaped pipe ends are adapted to the funnel-shaped edges 5 of the openings of the reinforcing bottom 4 and are held form-fittingly and force-lockingly between the edges 5 of the openings of the reinforcing bottom 4 and the shell part 1'. The exterior side of the ends of the pipes 6 facing shell part 1'' are slightly chamfered such that a cone is formed which tapers in the direction of the pipe end. The conical ends of the pipes 6 facilitate the arrangement of shell part 1'' which, via openings adapted to the diameter of the pipes 6, is pushed onto the facing pipe ends. The edges of the openings of shell part 1'' which are flanged or folded over toward the interior, and clamped with increasing pressure to the outer circumference of the pipes 6.

Thus, the housing 1 shown in FIG. 1 can be assembled without any welded and/or soldered connections. The pipes 6, by virtue of the ends which are on the bottom in FIG. 1, are pushed from above into the openings of the reinforcing bottom 4 until the funnel-shaped, widened ends of pipes 6 rest on the funnel-shaped edges 5 of the openings of the reinforcing bottom 4. Then the reinforcing bottom 4 is connected with shell part 1' by pressure assembling in the manner shown in FIG. 4. Now shell part 1'', by virtue of its openings, is pushed onto the facing ends of the pipes 6, in which case the edges of the openings of shell part 1'' are held on the outer circumference of pipes 6 by clamping or by a press fit.

If necessary, it is also possible to construct the openings of shell part 1'' slightly oversized and to widen the pipe ends facing the shell part 1'' as shown at the portion designated by numeral 7 after the fitting-on of shell part 1'' by way of a known spike-type tool in order to produce a press fit between the pipe ends and the edges of the openings of shell part 1'''.

After the assembling of the housing 1, the shell parts 1' and 1'' may be connected at their edges disposed on top of one another by a continuous soldering operation. In addition, the ends of the pipes 6 are also continuously soldered to the shell parts 1' and 1'' in order to securely seal the housing 1.

The embodiment shown in FIG. 2 wherein similar parts are designated by the same numerals differs from that of FIG. 1 essentially only by the fact that the ends of the pipes 6 facing shell part 1' have front faces 6' which are flanged toward the interior and which annularly enclose a central opening at approximately the same level as the receiving opening 3. Correspondingly, the front faces 6' form a reinforcement of the shell part 1 in the vicinity of the receiving bores 3, i.e., the side of the front faces 6' of the pipes 6 facing away from shell part 1' forms the bearing surface for the heads of the fastening screws 2.

In the embodiment shown in FIG. 3, the edges 5 of the openings of the reinforcing bottom 4 form a short cylinder which reaches around cylindrically molded-out ends of the pipes 6 by pressure or clamping.

In the embodiments shown in FIGS. 2 and 3, shell part 1' and pipes 6 may, in each case, be soldered or welded to one another at the edges of the receiving openings 3 as well as the corresponding edges of the central openings of the front faces 6'.

Instead of the conical widening of the ends of pipes 6 which are on top in FIGS. 1 and 2, a torus may be added to or molded on the pipes so as to be overlapped and held by the funnel-shaped edges 5 of the reinforcing bottom 4.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A muffler for internal combustion engine exhaust gases, comprising a housing adapted to be mounted at the engine and having two shell parts with one shell part forming an engine side and the other shell part facing away from the engine side; passage bores located in said one shell part and adapted for insertion of fastening screws for attachment of said one shell part to the engine; and pipes penetrating the housing, each pipe being operatively associated with a respective one of said passage bores, one end of each pipe being held at the one shell part in coaxial arrangement to the respective passage bore, the other end of each pipe penetrating the other shell part and forming an access to the respective passage bore for insertion of the respective fastening screw in said passage bore, wherein a reinforcing bottom having openings arranged concentrically with respect to the passage bores is arranged on an interior side of the engine-side shell part, the openings of the reinforcing bottom each have an edge directed toward the interior of the housing, said edge wrapping with pressure the adjacent end of the respective pipe whereby the pipes are held at the reinforcing bottom in at least one of a force-locking and form-fitting manner, wherein the openings of the reinforcing bottom each have an edge directed toward an interior space of the housing in the shape of a funnel tapering in the direction toward the interior, and the ends of the pipes adjacent to the reinforcing bottom each have a widened portion fitting into the funnel shape of the reinforcing bottom such that the widened portions of the pipe ends are form-fittingly held between the engine-side shell part and the funnel-shaped edges of the openings of the reinforcing bottom.

2. A muffler for internal combustion engine exhaust gases, comprising a housing adapted to be mounted at the engine and having two shell parts with one shell part forming an engine side and the other shell part facing away from the engine side and the other shell part facing away from the engine side; passage bores located in said one shell part and adapted for insertion of fastening screws for attachment of said one shell part to the engine; and pipes penetrating the housing, each pipe being operatively associated with a respective one of said passage bores, one end of each pipe being held at the one shell part in coaxial arrangement to the respective passage bore, the other end of each pipe penetrating the other shell part and forming an access to the respective passage bore for insertion of the respective fastening screw in said passage bore, wherein a reinforcing bottom having openings arranged concentrically with respect to the passage bores is arranged on an interior side of the engine-side shell part, the openings of the reinforcing bottom each have an edge directed toward the interior of the housing, said edge wrapping with pressure the adjacent end of the respective pipe whereby the pipes are held at the reinforcing bottom in at least one of a force-locking and form-fitting manner, wherein the pipe ends facing the engine-side shell part have annular front faces forming flanges directed inwardly of the respective pipes to define central openings.

3. The muffler according to claim 2, wherein the central openings in the annular front faces have a diameter approximately the same as a diameter of the passage bores of the engine-side shell part arranged with the same axis, and the annular front faces form a bearing surface for the heads of the fastening screws.

4. The muffler according to claim 2, wherein the ends of the pipes penetrating the other shell part facing away from the engine are disposed under pressure in openings of the other shell part.

5. A muffler for internal combustion engine exhaust gases, comprising a housing adapted to be mounted at the engine and having two shell parts with one shell part forming an engine side and the other shell part facing away from the engine side; passage bores located in said one shell part and adapted for insertion of fastening screws for attachment of said one shell part to the engine; and pipes penetrating the housing, each pipe being operatively associated with a respective one of said passage bores, one end of each pipe being held at the one shell part in coaxial arrangement to the respective passage bore, the other end of each pipe penetrating the other shell part and forming an access to the respective passage bore for insertion of the respective fastening screw in said passage bore, wherein a reinforcing bottom having openings arranged concentrically with respect to the passage bores is arranged on an interior side of the engine-side shell part, the openings of the reinforcing bottom each have an edge directed toward the interior of the housing, said edge wrapping with pressure the adjacent end of the respective pipe whereby the pipes are held at the reinforcing bottom in at least one of a force-locking and form-fitting manner, wherein an exterior side of the ends of the pipes at the other shell part facing away from the engine is funnel shaped, thereby forming end parts with reduced diameters, such that the other shell part, which has adapted openings, can be pushed by its openings onto said end parts wherein an increasing pressure between the end parts and the edges of said openings is achieved.

6. The muffler according to claim 2, wherein the ends of the pipes penetrating the other shell part are widened in the formed openings for a press fit.

7. The muffler according to claim 2, wherein the engine-side shell part is connected with the reinforcing bottom by pressure-assembling.

8. The muffler according to claim 1, wherein edges of the shell parts face one another and are tightly joined together, the edges of the passage bores are tightly joined together with the edges of the central openings of the annular front faces of the respective pipe ends, and the other pipe ends are joined together with the other shell part facing away from the engine.

* * * * *